United States Patent
Kallevig et al.

(10) Patent No.: US 7,624,562 B2
(45) Date of Patent: Dec. 1, 2009

(54) MOWER CUTTING DECK HAVING OPERATOR CONTROLLED DISCHARGE OPENING USING INTUITIVELY OPERABLE HANDLE

(75) Inventors: Jeffrey B. Kallevig, Eden Prairie, MN (US); Jerrod N. Winter, Cottage Grove, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 11/888,910

(22) Filed: Aug. 2, 2007

(65) Prior Publication Data

US 2009/0031690 A1 Feb. 5, 2009

(51) Int. Cl.
*A01D 67/00* (2006.01)

(52) U.S. Cl. .................................... 56/320.2

(58) Field of Classification Search ............... 56/320.2, 56/320.1, 16.6, 17.4, 17.3
See application file for complete search history.

(56) References Cited

U.S. PATENT DOCUMENTS

| | | | | |
|---|---|---|---|---|
| 2,578,880 A | * | 12/1951 | Doyle | 56/17.2 |
| 3,192,692 A | * | 7/1965 | Slemmons | 56/13.4 |
| 3,404,519 A | * | 10/1968 | Demers | 56/14.7 |
| 3,514,931 A | * | 6/1970 | Solheim | 56/255 |
| 3,925,972 A | * | 12/1975 | Andersson | 56/320.2 |
| 4,226,074 A | * | 10/1980 | Mullet et al. | 56/320.2 |
| 4,854,115 A | * | 8/1989 | Jones et al. | 56/320.1 |
| 5,033,260 A | * | 7/1991 | Jerry | 56/320.2 |
| 5,040,364 A | * | 8/1991 | Deegan | 56/320.2 |
| 5,117,616 A | * | 6/1992 | McLane | 56/17.5 |
| 5,133,175 A | * | 7/1992 | Dumbrell | 56/17.4 |
| 5,179,823 A | * | 1/1993 | Pace | 56/16.9 |
| 5,195,311 A | | 3/1993 | Holland | |
| 5,499,494 A | * | 3/1996 | Boshell et al. | 56/320.1 |
| 5,826,417 A | * | 10/1998 | Evans | 56/320.2 |
| 5,884,463 A | * | 3/1999 | Darzinskis | 56/13.4 |
| 6,609,358 B1 | * | 8/2003 | Schmidt et al. | 56/320.2 |
| 6,857,256 B2 | * | 2/2005 | Strange et al. | 56/320.2 |
| 6,862,875 B2 | * | 3/2005 | Iida et al. | 56/320.2 |
| 6,874,309 B1 | | 4/2005 | Bellis, Jr. | |
| 6,971,224 B1 | * | 12/2005 | Hancock | 56/320.2 |
| 7,185,479 B1 | * | 3/2007 | Cartner | 56/320.1 |
| D556,788 S | * | 12/2007 | Bucher et al. | D15/17 |
| D564,543 S | * | 3/2008 | Bucher et al. | D15/17 |
| 7,337,602 B1 | * | 3/2008 | Butler et al. | 56/320.2 |
| D565,604 S | * | 4/2008 | Bucher et al. | D15/17 |
| 7,448,195 B2 | * | 11/2008 | Kohler | 56/320.2 |
| 2003/0217540 A1 | * | 11/2003 | Osborne | 56/320.1 |

(Continued)

*Primary Examiner*—Árpád Fábián-Kovács
(74) *Attorney, Agent, or Firm*—James W. Miller

(57) ABSTRACT

A mower has a rotary cutting deck with a discharge opening covered by a discharge chute. A pivotal gate is placed beneath the discharge chute to pivot relative to the discharge opening between a closed position in which the gate blocks the discharge opening and an open position in which the gate opens the discharge opening, thereby providing discharge and non-discharge modes of operation respectively. A pivotal handle can be pivoted between first and second positions to thereby pivot the gate between the open and closed positions thereof. The handle and gate are arranged so that at least some portion of the handle extends in directions relative to the mower that are the same as the directions the gate extends relative to the discharge opening so that an operator can simply position the handle by observation of the handle portion to position the handle portion in an orientation corresponding to a desired orientation of the gate.

15 Claims, 7 Drawing Sheets

U.S. PATENT DOCUMENTS

2003/0217542 A1* 11/2003 Osborne .................... 56/320.1
2004/0112031 A1*  6/2004 Dickey ...................... 56/320.2
2004/0231311 A1* 11/2004 Kallevig .................... 56/320.2
2005/0005588 A1*  1/2005 Jager ......................... 56/15.7
2006/0037299 A1*  2/2006 Kallevig ..................... 56/15.7

* cited by examiner

MOWER CUTTING DECK HAVING OPERATOR CONTROLLED DISCHARGE OPENING USING INTUITIVELY OPERABLE HANDLE

TECHNICAL FIELD

This invention relates to a rotary mower cutting deck having a discharge opening through which grass clippings may be discharged from the deck.

BACKGROUND OF THE INVENTION

Lawn mowers are known having rotary cutting decks attached to or carried by the frame of the mower. Rotary cutting decks carry one or more cutting blades that rotate in substantially horizontal cutting planes. The decks are called rotary decks because of the rotary nature of the blade(s). The grass clippings created by the rotating action of the blade(s) are usually discharged through a discharge opening, often located on the right side of the deck. A discharge chute often extends outwardly from the side of the deck to shield the discharge opening to guard against inadvertent contact with the blade by a bystander and to control the direction of the discharged clippings.

Multi-bladed rotary cutting decks of this type are often carried on riding lawn mowers that are operated by an operator who is seated on a seat on the frame of the mower. In addition, rotary cutting decks of this type are also often convertible between a discharge mode of operation, in which the discharge opening is open, and a non-discharge mode of operation, in which the discharge opening is blocked. When the discharge opening is blocked, the grass clippings cannot escape through the discharge opening.

The reason for having a non-discharge mode of operation is to save time when cutting around areas in which the discharge of grass clippings would not be desirable. For example, if the operator is mowing or trimming around flower beds, sidewalks, driveways, or the like, the operator normally wants to prevent grass clippings from being discharged into the flower beds or onto the sidewalks and driveways. In a mower with a continuously open discharge opening oriented on the right side of the mower deck, this meant that the operator always had to place the left or non-discharge side of the cutting deck adjacent the flower beds, sidewalks, driveways, etc. when passing past such areas. Thus, the operator would frequently have to change directions while mowing to get the left side of the cutting deck up against the areas where the clippings should not be discharged. This need to change direction takes extra time and can be annoying to the operator.

Some riding mowers have a blocking member adjacent the discharge opening that comprises a pivotal flap or gate. The gate has a closed position in which the gate covers the discharge opening in the non-discharge mode. The gate also has an open position in which the gate is clear of the discharge opening in the discharge mode.

Thus, when the operator is mowing, if the operator comes to an area where grass clippings should not be discharged and the discharge opening is adjacent such areas, the operator can simply temporarily pivot the gate into its closed position to block the discharge opening. In this position, the grass clippings simply hit the closed gate and fall down to the ground without being discharged outside the deck. When the mower clears this area, the operator can pivot the gate back to its open position to resume discharging grass clippings from the deck. Moving the gate between its open and closed positions can be done quickly and on a temporary basis to block the grass clippings for even very short periods of time without having to change the direction of motion of the mower.

The gate in such mowers is connected by a linkage to an operating handle placed near the operator's seat. The operator can swing the gate between its open and closed positions simply by moving the operating handle from one handle position to another. This can be done without stopping the mower and without the operator dismounting the mower. U.S. Pat. No. 6,874,309 to Bellis, Jr. discloses a handle operated, pivotal gate of this type.

There are disadvantages with handle operated gates of this type. It is not always apparent which way the handle should be moved in order to open and close the gate. Accordingly, the operator has to learn this or pay attention to any type of operating instructions that might be placed on the mower near the handle. Until the operator has thoroughly learned the proper operation of the handle, it may be difficult to smoothly open and close the gate. Accordingly, there is a need in the art for a pivotal gate that is arranged and linked to an operating handle in which the proper operation of the handle is more intuitively apparent to the operator.

In addition, known gates pivot about substantially horizontal pivot axes. This arrangement provides little opportunity to offer effective intermediate positions of the gate. In such intermediate positions, the grass clippings tend to be deposited as a narrow band or windrow. This is not desirable.

SUMMARY OF THE INVENTION

One aspect of this invention relates to a mower cutting deck having a discharge opening for discharging grass clippings from the cutting deck with the mower having an operator's station for carrying an operator thereon during mowing. This aspect of the invention comprises a movable gate having a closed position in which the gate substantially blocks the discharge opening to place the cutting deck in a non-discharge mode of operation and an open position in which the gate substantially clears the discharge opening to place the cutting deck in a discharge mode of operation. A pivotal handle can be pivoted by the operator to move the gate between the closed and open positions thereof. The handle has a hand grip. The position of the hand grip relative to the mower mimics the position of the gate relative to the discharge opening such that the operator can observe the hand grip of the handle and set the hand grip in the same relative position on the mower as a desired setting of the gate relative to the discharge opening on the cutting deck.

Another aspect of this invention relates to a mower having a rotary cutting deck with a discharge opening covered by a discharge chute. A pivotal gate is placed beneath the discharge chute to pivot relative to the discharge opening between a closed position in which the gate substantially blocks the discharge opening and an open position in which the gate substantially opens the discharge opening, thereby providing discharge and non-discharge modes of operation respectively. A pivotal handle can be pivoted between first and second positions to thereby pivot the gate between the open and closed positions thereof. The handle and gate are arranged so that at least some portion of the handle extends in directions relative to the mower that are the same as the directions the gate extends relative to the discharge opening so that an operator can properly position the handle by observation of the handle portion to position the handle portion in an orientation corresponding to a desired orientation of the gate.

Yet another aspect of this invention relates to a mower having a rotary cutting deck with a discharge opening covered by a discharge chute. The discharge chute has a flexible body that is formed into a downwardly facing chute-like form by a shaping frame along one side of the discharge chute. A pivotal gate is placed beneath the discharge chute to pivot relative to the discharge opening between a closed position in which the gate substantially blocks the discharge opening and an open position in which the gate substantially opens the discharge opening, thereby providing discharge and non-discharge modes of operation respectively. The pivotal gate is attached to a vertically upwardly extending pivot pin. The pivot pin of the gate extends upwardly through the discharge chute and is rotatably journalled on the shaping frame of the discharge chute so as to be carried on the discharge chute.

An additional aspect of this invention relates to a mower having a rotary cutting deck formed by a top wall and a peripheral wall that enclose a plurality of cutting chambers each of which houses at least one rotary cutting blade that rotates in a substantially horizontal cutting plane. The peripheral wall of the cutting deck includes a discharge opening for allowing grass clippings to exit from the cutting deck. The discharge opening is covered by a generally U-shaped discharge chute that includes a top wall, a front wall and a rear wall. The discharge chute faces downwardly towards the ground and extends outwardly away from the discharge opening of the cutting deck. A pivotal gate is carried beneath the top wall of the discharge chute and pivots about a substantially vertical axis located adjacent the front wall of the discharge chute.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
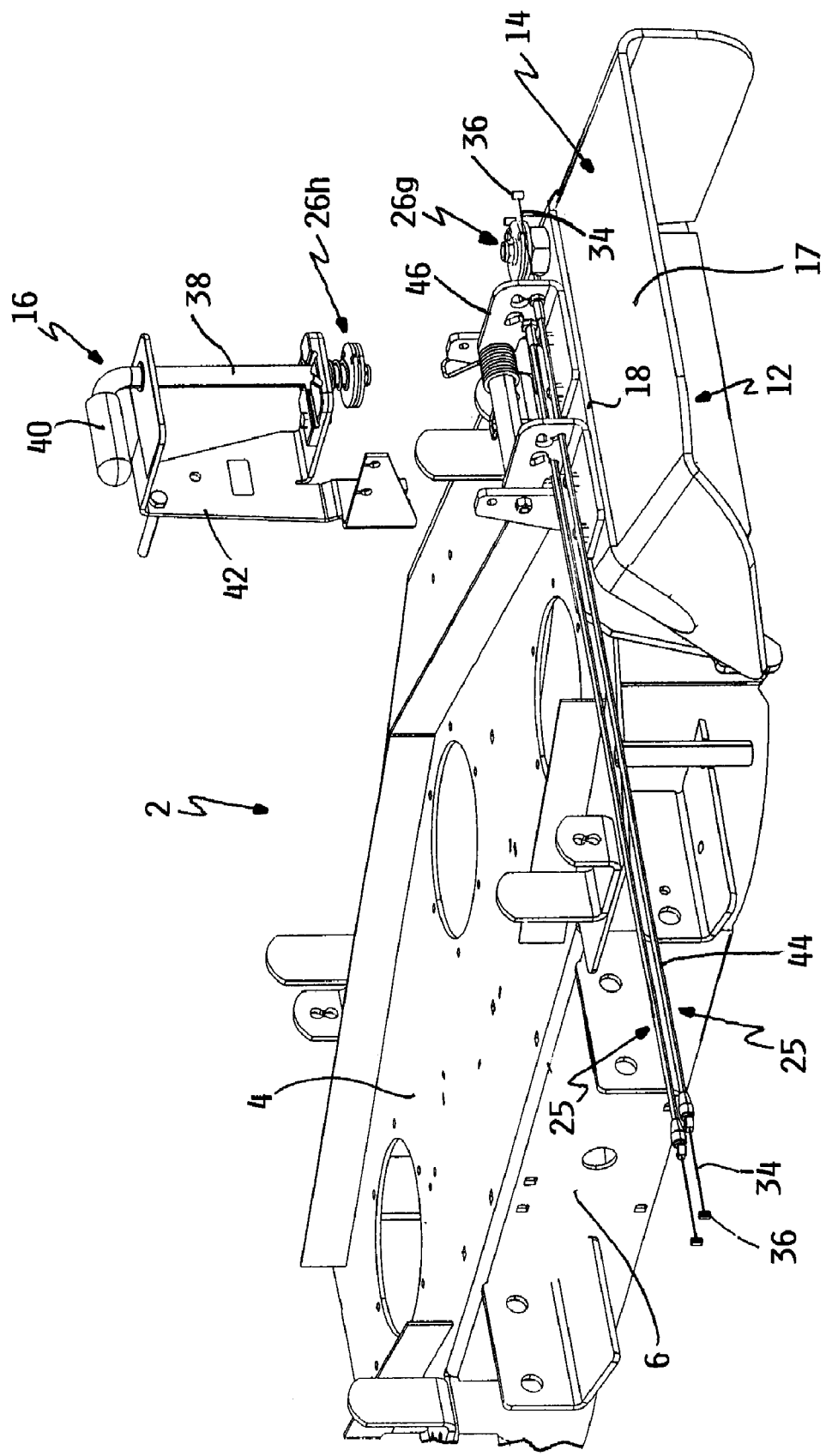
FIG. 1 is a perspective view of a rotary cutting deck according to this invention, particularly illustrating the pivotal gate located beneath the discharge chute of the mower with the pivotal gate being in its closed position to block the discharge opening of the deck.
Figure 2:
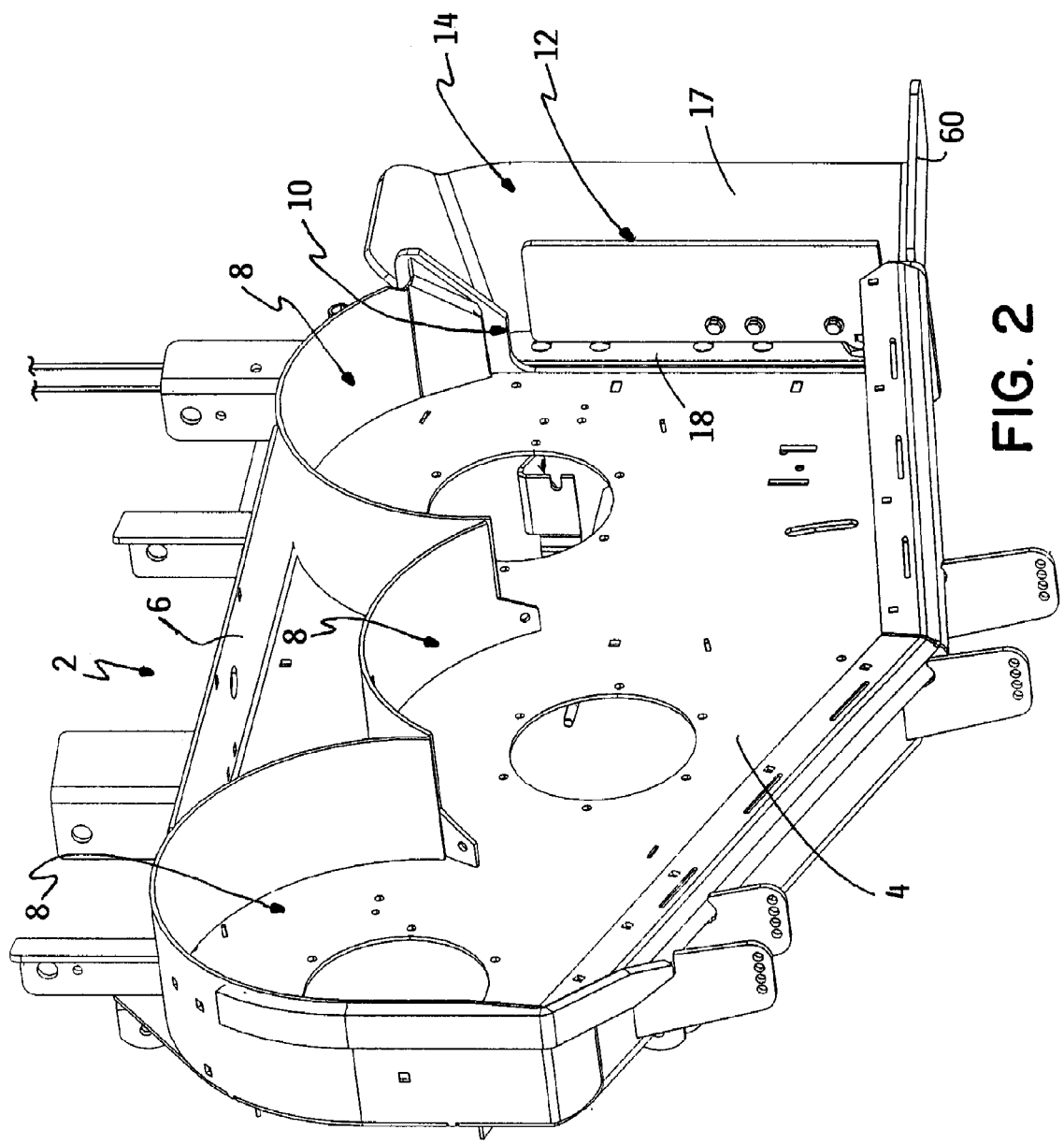
FIG. 2 is an inverted perspective view of the rotary cutting deck of FIG. 1, particularly showing the pivotal gate in its closed position to block the discharge opening of the deck.

FIGS. 1 and 2 show a rotary cutting deck 2 of the type that is attached to or carried by the frame of a lawn mower (not shown). Cutting deck 2 has a top wall 4, a peripheral wall 6 that extends downwardly from top wall 4 and forms the peripheral boundary of cutting deck 2, and three cutting chambers 8 beneath top wall 4. Each cutting chamber 8 houses a rotary cutting blade (not shown) that rotates in a substantially horizontal cutting plane about a substantially vertical axis. As the cutting blades rotate, grass clippings are generated by the impact of the cutting edges of the blades with standing stalks of grass.

Referring to FIG. 2, cutting chambers 8 are open to one another so that the grass clippings created by the cutting blades can flow between cutting chambers 8 towards a common discharge opening 10. Discharge opening 10 is provided somewhere in the peripheral boundary of cutting deck 2 and usually on one side of cutting deck 2. In FIGS. 1 and 2, discharge opening 10 is shown blocked by a pivotal gate 12 that forms part of one embodiment of the present invention. FIGS. 1 and 2 show gate 12 in a closed position substantially overlying discharge opening 10.

As is customary in mowers of this type, discharge opening 10 is also covered by a generally U-shaped, downwardly facing, discharge chute 14 that extends outwardly from peripheral wall 6 for a short distance. Discharge chute 14 serves to protect bystanders from any objects that might be entrained in the grass clippings and be thrown through discharge opening 10. Discharge chute 14 will deflect such objects downwardly towards the ground and will prevent bystanders from inadvertently sticking their feet into discharge opening 10. Gate 12 is positioned beneath discharge chute 14 as shown in FIG. 1.

Discharge chute 14 is preferably constructed in accordance with the assignee's prior U.S. Pat. No. 6,986,240 to Kallevig, which is hereby incorporated by reference. Discharge chute 14 has a main body 17 that is formed out of a flexible material, such as rubber. Main body 17 is shaped into a chute-like form by a rigid shaping frame 18 forming part of the entrance to discharge chute 14. However, discharge chute 14 could be made entirely out of a rigid material if so desired.

One embodiment of this invention also includes a pivotal handle 16 carried in or adjacent the operator's station (not shown) of the mower. The operator's station is provided on the frame of the mower and usually includes either a seat on which the operator is seated or a platform on which the operator stands. As shall be explained in more detail hereafter, handle 16 is operatively connected to gate 12. The operator can swing or pivot handle 16 with his or her hand while the operator is carried on the mower at the operator's station to control the position of gate 12 relative to discharge opening 10.

Figure 3:
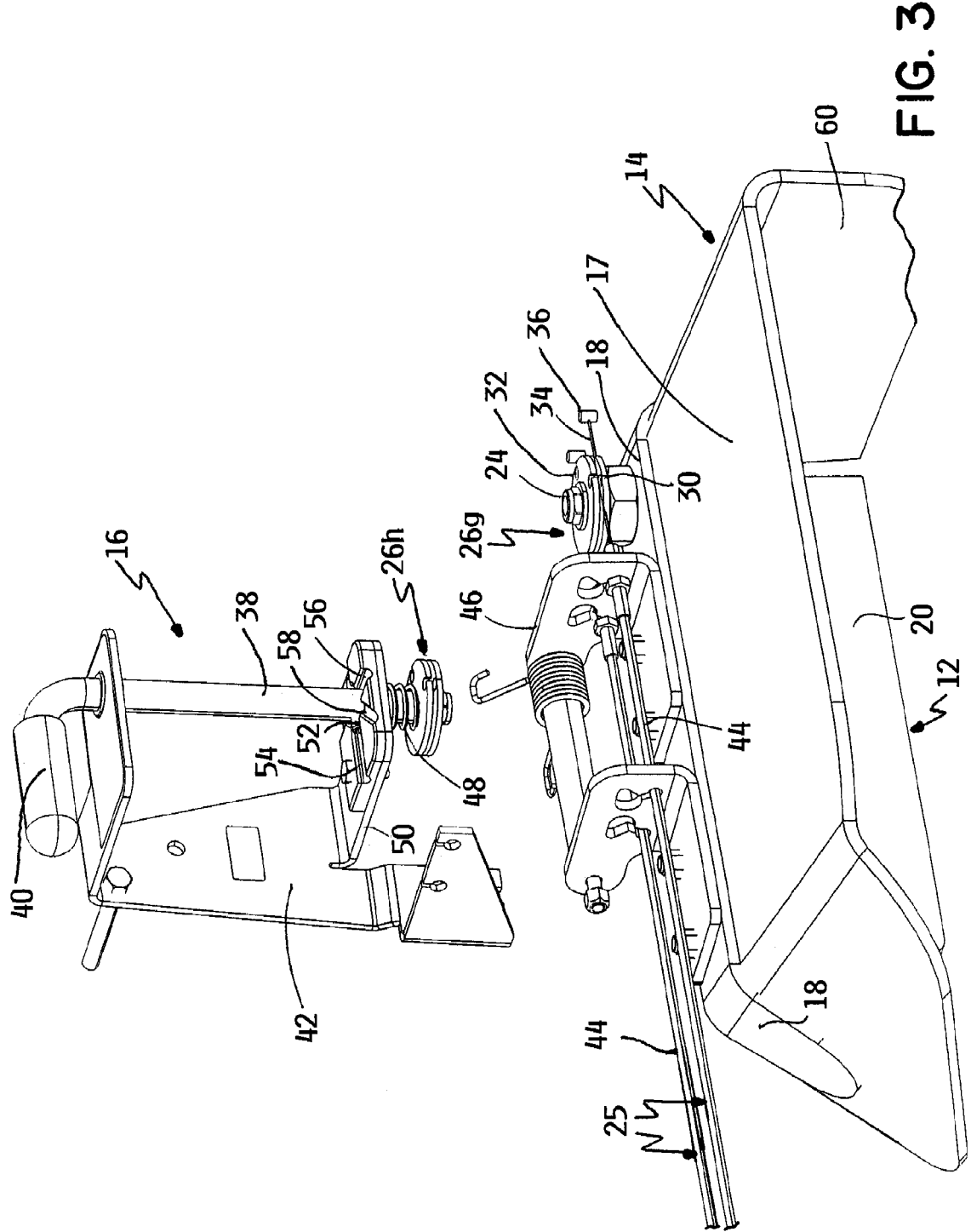
FIG. 3 is a perspective view of the pivotal gate and discharge chute in FIG. 1 along with the pivotal handle for operating the gate.
Figure 4:
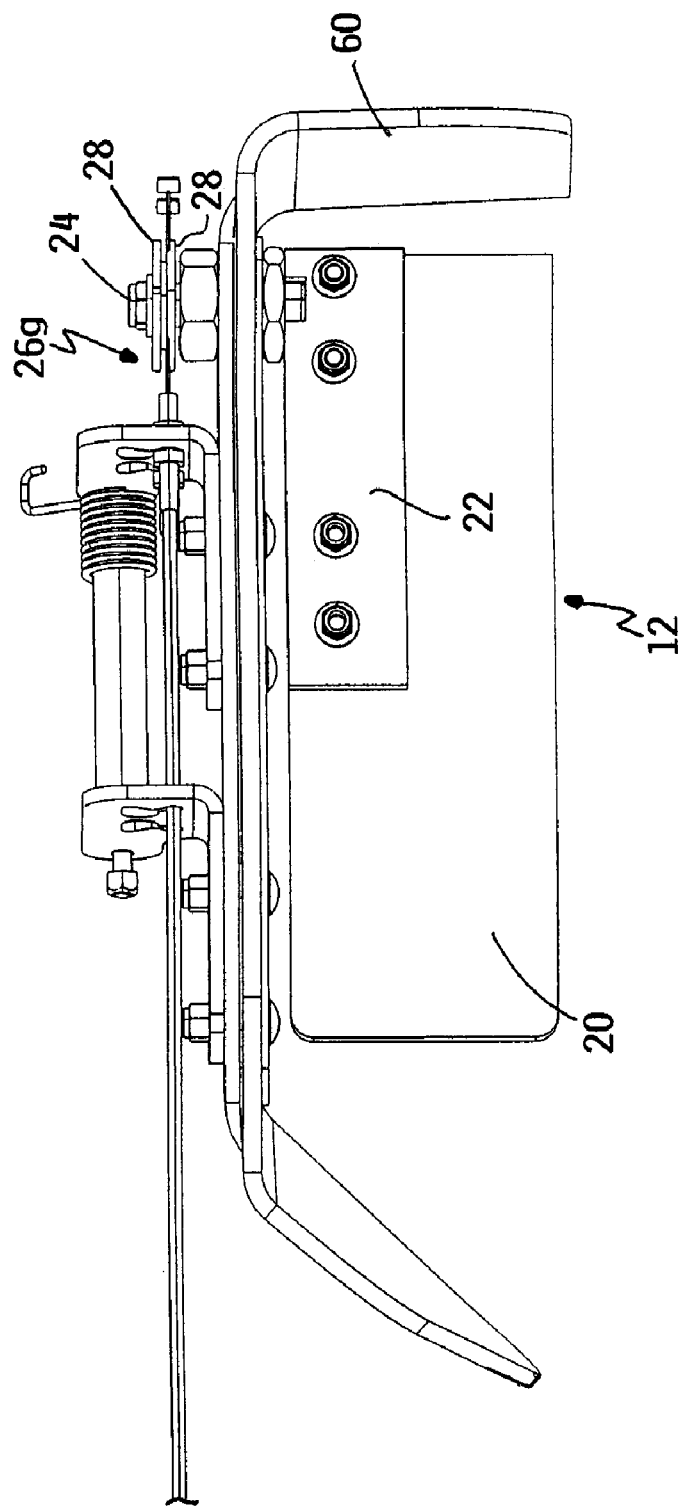
FIG. 4 is a perspective view of just the pivotal gate and discharge chute shown in FIG. 3.
Figure 5:
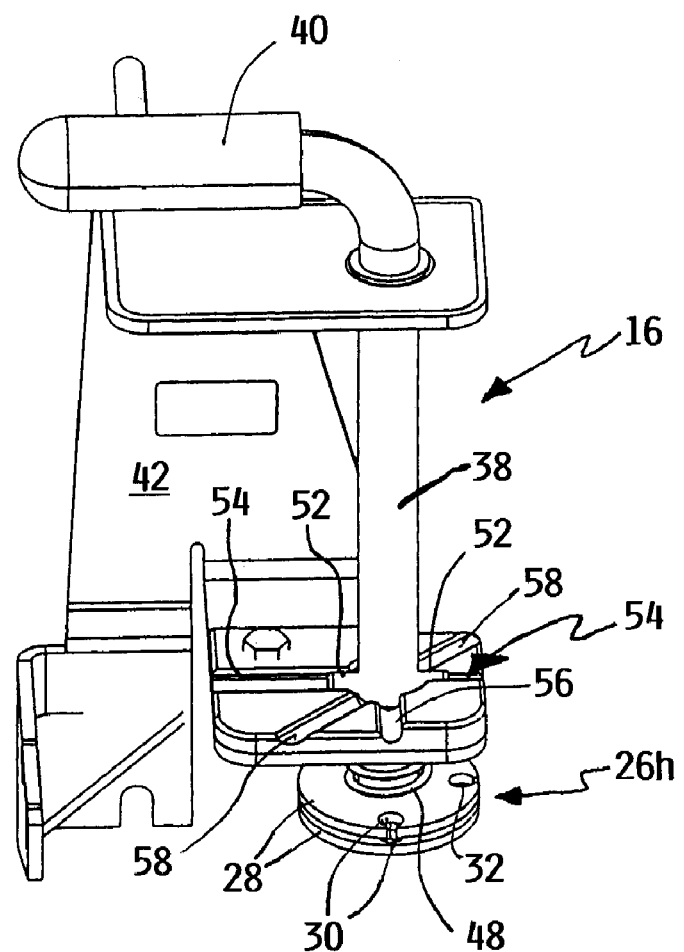
FIG. 5 is a perspective view of just the pivotal handle shown in FIG. 3.

Referring now to FIGS. 3-5, gate 12 comprises a rectangular flexible flap 20, made of a stiffer but still flexible rubber material similar to that used in discharge chute 14, that is bolted to a rigid upper support plate 22. A vertically extending gate pivot pin 24 is attached to a front end of support plate 22 at the front of flap 20. Pivot pin 24 is journalled in the front end of the shaping frame 18 of discharge chute 14 for rotation about a substantially vertical pivot axis. Gate 12 is approximately the same size as or slightly less in size than the size of discharge opening 10 to block discharge opening 10 when gate 12 is closed. See FIG. 2.

A pair of Bowden cables 25 connect gate 12 to handle 16. The top of gate pivot pin 24 includes a gate pulley $26_g$ fixed thereto such that gate pivot pin 24 is rotated when gate pulley $26_g$ is rotated. Gate pulley $26_g$ includes a pair of spaced upper and lower flanges 28 that include a pair of aligned openings 30 and 32 therein. The inner cable 34 of a Bowden cable 25 has an enlarged circular head 36 that is received in one pair of the aligned openings 30 or 32 with inner cable 34 lying in the groove between upper and lower flanges 28. Since there are two Bowden cables 25, the inner cable 34 of one Bowden cable 25 is connected to the pair of openings 30 in gate pulley $26_g$ and the inner cable 34 of the other Bowden cable 25 is connected to the other pair of openings 32 in gate pulley 26$_g$. Note that cable heads 36 are shown disconnected from openings 30 and 32 in the drawings for the purpose of clarity.

Handle 16 is L-shaped having a vertical shaft 38 and a horizontal hand grip 40. Handle shaft 38 is rotatably journalled for rotation about a substantially vertical axis in a bracket 42. Bracket 42 is fixed to the frame of the mower in or adjacent to the operator's station. Thus, hand grip 40 of handle 16 is close to the operator's hand while the operator is operating the mower.

The lower end of handle shaft 38 includes a handle pulley 26$_h$ that is identical to gate pulley 26$_g$. The other ends of the inner cables 34 of Bowden cables 25 are connected to the pairs of openings 30 and 32 in handle pulley 26$_h$. Again, the other ends of the inner cables 34 of Bowden cables 25 are shown disconnected from handle pulley 26$_h$ in the drawings simply for the purpose of clarity. In addition, the drawings also depict handle 16 more forwardly relative to cutting deck 2 than is the case in practice. In reality, handle 16 would normally be carried on the frame of the mower rearwardly of the rear ends of the inner cables 34 of Bowden cables 25.

Bowden cables 24 are set up to produce an identical direction of rotation in both handle 16 and gate pivot pin 24, i.e. when handle pulley 26$_h$ rotates clockwise so does gate pulley 26$_g$ and when handle pulley 26$_h$ rotates counter-clockwise so does gate pulley 26$_g$. Also, as is typical of Bowden cables 25, each Bowden cable 25 has an outer sheath 44 that is appropriately clamped to a bracket 46 on discharge chute 14 and to bracket 42 with inner cable 34 sliding back and forth within outer sheath 44. In addition, sheath 44 can be clamped or tied at other locations to cutting deck 2 or the frame of mower 4 to help secure cable 25 in place as it extends between gate 12 and handle 16. However, there is enough slack in cable 25 to accommodate any relative movement between cutting deck 2 and the frame of the mower during a mowing operation.

A spring 48 bears between the underside of a horizontal flange 50 on bracket 42 and the top of handle pulley 26$_h$. Spring 48 is not strong enough to prevent handle pulley 26$_h$ or handle shaft 38 from rotating when handle 16 is turned by the operator. However, spring 48 is strong enough to engage a detent pin 52 on handle shaft 38 with one detent groove in a series of detent grooves 54, 56, or 58 carried on the top of horizontal flange 50 on bracket 42. The detent pin/detent groove structure helps hold handle 16, and thus gate 12, in one of a series of positions.

The detent grooves include a first longitudinal detent groove 54 that is parallel to a forward direction of motion of the mower. When detent pin 52 is engaged in the first longitudinal detent groove 54, hand grip 40 of handle 16 is also parallel to a forward direction of motion of the mower since hand grip 40 is parallel to detent pin 52. When detent pin 52 is engaged in the first longitudinal detent groove 54, gate 12 is arranged in its closed position to block discharge opening 10. In this closed position, gate 12 is also parallel to the forward direction of motion of the mower.

Accordingly, the orientation of hand grip 40 of handle 16 mimics the orientation of gate 12 relative to discharge opening 10. When hand grip 40 is parallel to the forward direction of motion, namely when hand grip 40 is pointing to the rear as shown in the drawings, gate 12 will be similarly oriented on the cutting deck to block discharge opening 10.

If the user wants to open discharge opening 10, the user grips hand grip 40 of handle 16 and pulls up slightly against the bias of spring 48 to disengage detent pin 52 from the first longitudinal detent groove 54. The user can then swing handle 16 to the side by 90° until hand grip 40 of handle 16 is pointing outwardly towards the side. As handle 16 so rotates, this rotation is transmitted by the Bowden cables 25 to gate pivot pin 24 to similarly rotate gate 12. Gate 12 will swing forwardly inside discharge chute 14 until gate 12 is generally adjacent or aligned with the front wall 60 of discharge chute 14.

Figure 6:
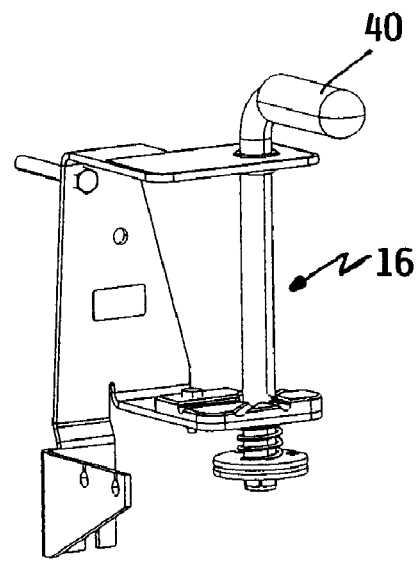
FIG. 6 is perspective view of the pivotal handle and pivotal gate shown in FIG. 1, particularly illustrating the pivotal gate in its open position to clear the discharge opening of the deck.
Figure 6:
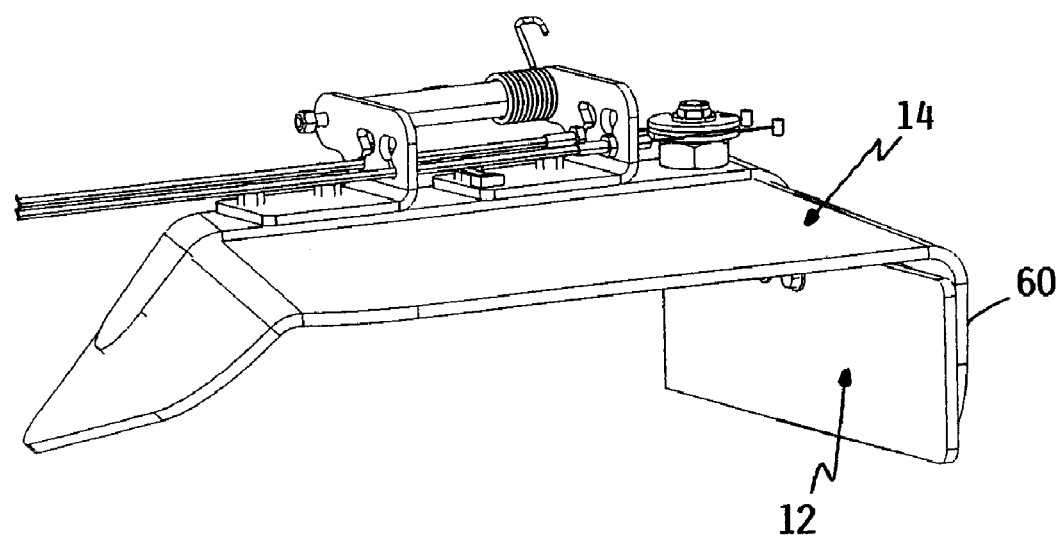

In this open position of gate 12 as shown in FIG. 6, discharge opening 10 is now clear or unblocked and the grass clippings can exit through discharge opening 10. Again, in this open position of gate 12, the positions of gate 12 and hand grip 40 of handle 16 mimic one another. Both will be pointing straight out to the side. After making this rotational adjustment, the operator can let go of handle 16. Spring 48 is effective to reseat detent pin 52 in a second transverse detent groove 56.

Figure 7:
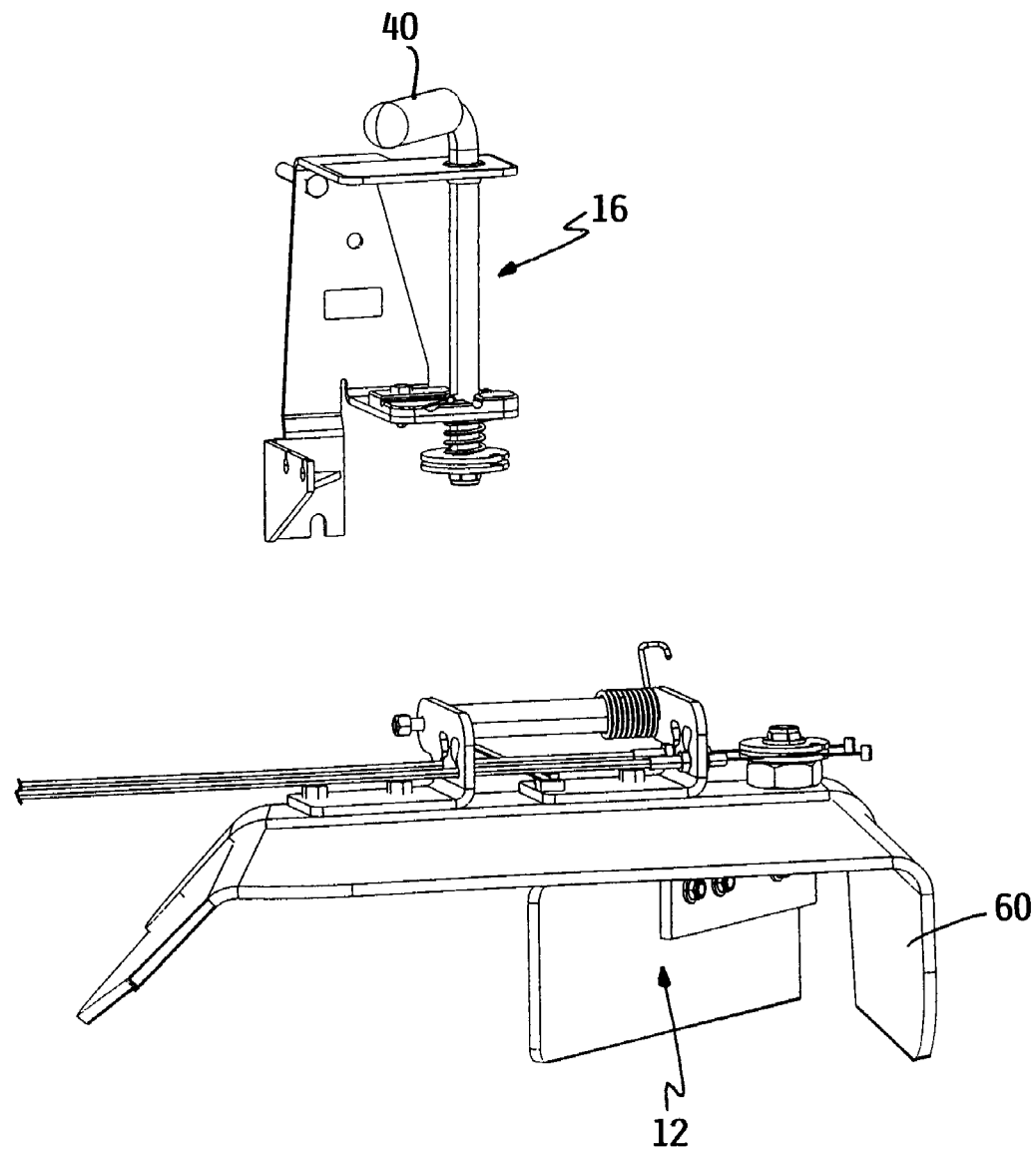
FIG. 7 is a perspective view similar to FIG. 6, but showing the pivotal gate in an intermediate position in which the gate only partially blocks the discharge opening.

A third detent groove 58 is provided that is midway between the first longitudinal detent groove 54 and the second transverse detent groove 56. This third inclined detent groove 58 allows the operator to position gate 12 in an intermediate position that is halfway between the open and closed positions of gate 12. In this intermediate position, gate 12 deflects the grass clippings and any debris or objects entrained therein rearwardly. The intermediate position of the gate disperses the grass clippings over a distance of approximately one half the dispersal distance in the fully open position. Again, in this position, handle 16 and gate 12 have positions that mimic each other, namely handle 16 and gate 12 are each now inclined outwardly at a 45° angle relative to the forward direction of motion of the mower. See FIG. 7.

In this invention, the operator knows the position of gate 12 from the position of handle 16 because the position of hand grip 40 visually mimics the location of gate 12 in a particular desired position. For example, to block discharge opening 10, the operator knows that gate 12 should lie flat against discharge opening 10 with gate 12 being parallel to the forward direction of motion of the mower. All the operator has to do is to position hand grip 40 of handle 16 similarly, i.e. to place hand grip 40 so that hand grip 40 extends rearwardly but parallel to the forward direction of motion of the mower.

Similarly, if the user wants discharge opening 10 to be unblocked by gate 12, the user knows that gate 12 should be pivoted 90° to the side to be oriented transversely to the forward direction of motion of the mower. All the user has to do is to pivot handle 16 similarly, i.e. to swing hand grip 40 forwardly 90° until hand grip 40 points to the side. If the user stops the swinging motion of hand grip 40 after only 45° of rotation, both hand grip 40 and gate 12 will be rotated into the intermediate partially open/partially closed position described above. Again, both the motion and position of hand grip 40 mimic the motion and position of gate 12. The user will intuitively understand how to control the position of gate 12 simply by observing the position of hand grip 40 and setting hand grip 40 in the same relative position on the mower as the desired setting of gate 12 on the cutting deck.

Various modifications of this invention will be apparent to those skilled in the art. Thus, the scope of this invention will be limited only by the appended claims.

We claim:

1. A mower having a rotary cutting deck with a side discharge opening along one lateral side of the cutting deck for discharging grass clippings laterally from the cutting deck, wherein a side discharge chute overlies the discharge opening and extends laterally outwardly beyond a peripheral sidewall of the cutting deck, the discharge chute comprising a front wall that extends laterally outwardly, a rear wall that extends laterally outwardly with the rear wall of the discharge chute being located further rearwardly on the cutting deck than the front wall of the discharge chute, and a top wall that extends laterally outwardly with the top wall of the discharge chute joining the front and rear walls of the discharge chute to provide the discharge chute with a generally U-shaped configuration that is open at a bottom thereof with the open bottom of the chute facing the ground laterally outwardly of the peripheral sidewall of the cutting deck, which comprises:

(a) only a single pivotal gate that pivots within the discharge chute beneath the top wall of the discharge chute and between the front and rear walls of the discharge chute, the pivotal gate pivoting on the one lateral side of the cutting deck about a substantially vertical gate pivot axis relative to the discharge opening between a closed position in which the gate substantially blocks the discharge opening and an open position in which the gate substantially clears the discharge opening, thereby providing discharge and non-discharge modes of operation respectively;

(b) an L-shared pivotal handle that can be pivoted by the operator about a substantially vertical handle pivot axis defined by a vertical shaft of the handle to move the gate between the closed and open positions thereof, wherein the handle has a substantially horizontal hand grip atop the vertical shaft with the hand grip pivoting within a substantially horizontal plane during pivoting of the handle, wherein the gate pivot axis and the handle pivot axis are two separate axes that are separated from one another along a fore-and-aft direction;

(c) at least one elongated connecting member extending in the fore-and-aft direction, wherein the connecting member operatively links the vertical shaft of the handle to the gate for causing the pivoting motion of the handle to be translated into pivoting motion of the gate; and (d) wherein the position of the hand grip relative to the mower mimics the position of the gate relative to the discharge opening such that the operator can observe the hand grip of the handle and set the hand grip in the same relative position on the mower as a desired setting of the gate relative to the discharge opening on the cutting deck.

2. The mower of claim 1, wherein the handle has a first position in which the hand grip is parallel to a forward direction of motion of the mower when the gate is parallel to the forward direction of motion of the mower, wherein the gate when parallel to the forward direction of motion of the mower is in the closed position thereof and substantially blocks the discharge opening.

3. The mower of claim 2, wherein the handle has a second position in which the hand grip is at right angles to the forward direction of motion of the mower when the gate is at right angles to the forward direction of motion of the mower, wherein the gate when at right angles to the forward direction of motion of the mower is in the open position thereof and substantially clears the discharge opening.

4. The mower of claim 3, wherein the handle has at least one intermediate position in which the hand grip is oriented between the open and closed positions when the gate is inclined at less than 90° to the forward direction of motion of the mower, wherein the gate when inclined at less than 90° to the forward direction of motion of the mower partially blocks and partially clears the discharge opening.

5. The mower of claim 1, wherein the gate in the open position thereof lies substantially adjacent the front wall of the discharge chute.

6. The mower of claim 5, wherein the gate pivots about a substantially vertical axis that passes through a top wall of the discharge chute.

7. The mower of claim 6, wherein the discharge chute comprises a flexible body that is shaped into a chute-like form by a rigid shaping frame, and wherein the substantially vertical pivot axis of the gate passes through the rigid shaping frame.

8. The mower of claim 3, further including handle detents for holding the handle in the first and second positions thereof.

9. The mower of claim 8, wherein the handle detents include a first longitudinal detent groove arranged parallel to a forward direction of motion of the mower and a second transverse detent groove arranged perpendicularly to the forward direction of motion of the mower, and wherein the handle detents include a detent pin on the handle that is received in the first longitudinal detent groove when the handle is in the first position and in the second transverse detent groove when the handle is the second position.

10. The mower of claim 9, wherein the handle is movable axially to engage and disengage the detent pin on the handle with a selected one of the first and second detent grooves.

11. The mower of claim 10, wherein the handle is spring biased in a direction that moves the detent pin into engagement with one of the first and second detent grooves when the handle is rotated to align the detent pin with the first and second detent grooves, and wherein the handle is movable along the axis of the vertical shaft by the operator against the spring bias to disengage the detent pin from the detent groove with which the detent pin had been engaged to allow the handle to be rotated.

12. The mower of claim 4, further including handle detents for holding the handle in the first, second and intermediate positions thereof.

13. A mower having a rotary cutting deck formed by a top wall and a peripheral wall that enclose a plurality of cutting chambers each of which houses at least one rotary cutting blade that rotates in a substantially horizontal cutting plane, wherein the peripheral wall of the cutting deck includes a side discharge opening for allowing grass clippings to exit laterally from a lateral side of the cutting deck, and wherein the discharge opening is covered by a generally U-shaped side discharge chute that includes a top wall, a front wall and a rear wall behind the front wall in the direction of forward motion of the cutting deck with the discharge chute having an open bottom facing downwardly towards the ground and with the discharge chute extending laterally outwardly away from the discharge opening of the cutting deck past the peripheral wall of the cutting deck, which comprises:

(a) only a single pivotal gate for opening and closing the discharge opening, wherein the single pivotal gate is separate and distinct from the front, top and rear walls of the discharge chute with the pivotal gate being located between the front and rear walls of the discharge chute and beneath the top wall of the discharge chute and with the single pivotal gate pivoting about a single substantially vertical axis located adjacent the front wall of the discharge chute; and (b) a plurality of detents for releasably locking the gate in one of at least three positions relative to the discharge chute comprising:

(i) an open position in which the gate is parallel to and adjacent the front wall of the discharge chute to substantially clear the discharge opening;

(ii) an intermediate position in which the gate is inclined rearwardly about the substantially vertical axis at an acute angle relative to the front wall of the discharge chute such that the gate deflects the grass clippings exiting the discharge opening rearwardly relative to the discharge chute; and (iii) a closed position in which the gate extends in a direction perpendicular to the front wall of the discharge chute to substantially block the discharge opening.

14. The mower of claim 13, wherein the gate is pivotally supported on the top wall of the discharge chute.

15. The mower of claim 13, wherein the positions of the gate are controlled by a pivotal handle carried on the mower, and wherein some portion of the handle acts as a visual indicator whose position on the mower visually mimics the position of the gate within the discharge chute.

* * * * *

UNITED STATES PATENT AND TRADEMARK OFFICE
CERTIFICATE OF CORRECTION

| | |
|---|---|
| PATENT NO. | : 7,624,562 B2 |
| APPLICATION NO. | : 11/888910 |
| DATED | : December 1, 2009 |
| INVENTOR(S) | : Jeffrey B. Kallevig et al. |

Page 1 of 1

It is certified that error appears in the above-identified patent and that said Letters Patent is hereby corrected as shown below:

Col. 7, Line 18, change "L-shared" to --L-shaped--.

Signed and Sealed this

Sixteenth Day of February, 2010

David J. Kappos
*Director of the United States Patent and Trademark Office*